P. Wilbor,
Cheese Press.

N° 11,580.  Patented Aug. 22, 1854.

UNITED STATES PATENT OFFICE.

PHILANDER WILBOR, OF MILAN, OHIO.

CHEESE-PRESS.

Specification of Letters Patent No. 11,580, dated August 22, 1854.

*To all whom it may concern:*

Be it known that I, P. WILBOR, of Milan, in the county of Erie and State of Ohio, have invented a new and useful Improvement in the Construction of Presses for Cheese, Pomace, Flocculent Substances, and for other Similar Purposes; and I do hereby declare that the following is a full and exact description thereof, reference being had to the accompanying drawings, making a part of this specification, in which—

Figure 4:
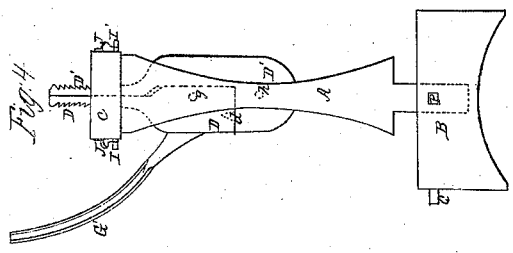
Figure 5:
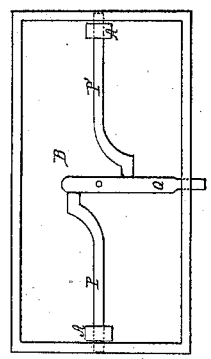
Figure 3:
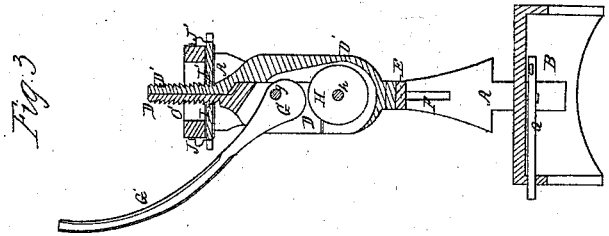
Figure 1:
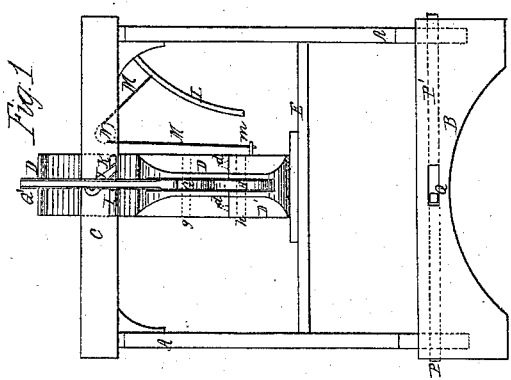
Figure 2:
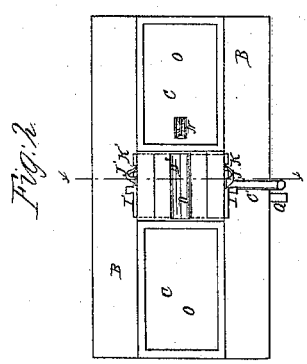

Figure 1 is a front view of my improved press, Fig. 2 a top view, Fig. 3 a transverse section in the direction of the line X—X in Fig. 2, Fig. 4 a side view, and Fig. 5 a view of the platform inverted showing the lever and rods for sustaining the frame in place.

Like letters refer to like parts in the different views.

A A are two standards, the lower ends of which pass through the platform B as seen in Figs. 1 and 3; upon the top of the standards is supported the frame C, through the center of which passes the upper end of the rack slides D and D' Figs. 3 and 4, *d d* are dowels or pins upon which the slide D moves and is retained in place.

The lower end of the rack slide D' is bolted to the cross bar E, its ends sliding in grooves in the standards A A, as seen at F, Fig. 3, which causes the rack slide to operate in a direct line.

In the rack slides, is a groove for a cam G, and friction roller H, which work upon the pins *g* and *h;* the cam G, and pin being connected to the rack slide D, which is separate from the rack slide D', to which the friction roller H, and pin is attached.

The slide catches I and I' pass through the frame and catch into the rack on the slides D and D' as seen in Fig. 3, and are retained in place by the springs J J'.

The material to be pressed is placed upon the platform under the rack D D'; then by bringing down the lever G', the cam G acts on the friction roller H, by which the slide rack D' is forced down, independently of the rack slide D, but as soon as the lever is raised, the cam G is also raised from the friction roller H, which allows the rack D to descend of its own weight so that the cam is again brought in contact with the friction roller. By the action of the cam on the roller, by means of the lever, the rack slide D' is forced down, thereby increasing the pressure on the material. When the rack slide D' is being forced down, the rack slide D remains stationary, and at the same time the cam G is raised from the roller H, the rack slide D' remains stationary, while the rack slide D falls, so as to bring the cam in contact with the roller, thus alternately, as the lever is raised and lowered in the operation of pressing, the rack slides D and D', pass down correspondingly, or in other words, as the lever descends, the rack slide D' descends correspondingly, and when the lever is being raised, the rack D drops in place, as seen in Figs. 1, 3, and 4.

It will be observed in Fig. 3, that the ends of the slides I and I' are of such form as to fit the racks. The angles of the rack teeth and slide are such as to allow the rack slides D D' to descend, but not to raise without withdrawing the slides, which is done by turning the springs so as to pass into the notches or slots K K', Figs. 1 and 2, this will allow the slides to be withdrawn or disconnected from the rack slide, which may then be raised to the desired height by means of the lever L and cord M Fig. 1; this cord is attached to the lever, and passes over the pulley N, and is connected to the rack slide D' at *m;* by this arrangement the rack slides are raised for further action, after the desired amount of pressure is given to the material, and by moving the slides I I' into connection with the racks, and also by turning the springs J J' from the slots K K', so as to be on the outside of the slides as seen in Figs. 3 and 4. The press will then be ready for operation.

One feature of improvement connected with this press consists in its arrangement as a self acting press, this is accomplished by placing the desired amount of material for pressure, in the boxes O O Fig. 2; then by withdrawing the slides P P' by means of the lever Q, to which they are connected, the frame work and press will continually descend upon the material being pressed, with a force equal to the weight applied. This mode of obtaining pressure may be brought into requisition, after a certain degree of pressure is obtained by the first mode described.

When the rack slides are operated for pressing, the slides P P' are passed through the lower end of the standards A A, into the ends of the platform as seen in Figs. 1 and 5, which prevents the entire press from raising or falling, and by withdrawing the slides P P' the press is allowed to descend upon the material being pressed, as before mentioned. I contemplate raising the entire press so as to be again supported in place by the slides P P', by means of tackles, levers, or other suitable devices. In constructing the press, the size and strength will of course be in all cases according to the amount of power required.

What I claim as my invention and desire to secure by Letters Patent, is—

The combination of the two rack slides D and D' with the respective attachments of the cam G and friction roller H, by which means, in connection with the slides I I', and accompanying racks, the press is operated in the manner and for the purpose set forth.

PHILANDER WILBOR.

Witnesses:
 Geo. Burt,
 F. Potter.